United States Patent
Tseng et al.

(10) Patent No.: US 11,466,205 B2
(45) Date of Patent: Oct. 11, 2022

(54) SEMICONDUCTOR NANOMATERIAL WITH HIGH STABILITY

(71) Applicant: Unique Materials Co., Ltd., Taipei (TW)

(72) Inventors: Huan-Wei Tseng, Taipei (TW); Yu-Jui Tseng, Taipei (TW); Chun-Wei Chou, Taipei (TW); Chia-Chun Liao, Taipei (TW); Chia-Yi Tsai, Taipei (TW); Ting-Yu Huang, Taipei (TW)

(73) Assignee: Unique Materials Co., Ltd., Taipei (TW)

( * ) Notice: Subject to any disclaimer, the term of this patent is extended or adjusted under 35 U.S.C. 154(b) by 132 days.

(21) Appl. No.: 17/105,446

(22) Filed: Nov. 25, 2020

(65) Prior Publication Data

US 2022/0162503 A1 May 26, 2022

(51) Int. Cl.
| | |
|---|---|
| *C09K 11/88* | (2006.01) |
| *C09K 11/08* | (2006.01) |
| *C09K 11/02* | (2006.01) |
| *B82Y 40/00* | (2011.01) |
| *B82Y 20/00* | (2011.01) |

(52) U.S. Cl.
CPC .......... *C09K 11/883* (2013.01); *C09K 11/025* (2013.01); *C09K 11/0883* (2013.01); *B82Y 20/00* (2013.01); *B82Y 40/00* (2013.01)

(58) Field of Classification Search
CPC . C09K 11/025; C09K 11/883; C09K 11/0883; B82Y 20/00; B82Y 40/00
See application file for complete search history.

(56) References Cited

FOREIGN PATENT DOCUMENTS

| CN | 106634946 A | * 5/2017 |
|---|---|---|
| TW | 201500275 | 1/2015 |
| TW | 201842090 | 12/2018 |

OTHER PUBLICATIONS

"Office Action of Taiwan Counterpart Application", dated May 17, 2021, p. 1-p. 6.

* cited by examiner

*Primary Examiner* — C Melissa Koslow
(74) *Attorney, Agent, or Firm* — JCIPRNET

(57) ABSTRACT

Quantum dot is a semiconductor nanomaterial. The quantum dot includes a core constituted of InP, a first shell constituted of ZnSe, a second shell constituted of ZnS, and a gradient alloy intermediate layer. The core is wrapped by the first shell. The first shell is wrapped by the second shell, and the first and second shells have different materials. The gradient alloy intermediate layer is between the core and the first shell. The gradient layer includes an alloy constituted of In, P, Zn and Se. A content of the In and P gradually decreases from the core to the first shell. A content of the Zn and Se gradually increases from the core to the first shell. A particle size of the quantum dot is greater than or equal to 11 nm. The quantum dot is capable of emitting light upon excitation with a photoluminescence quantum yield equal to or more than 50%.

7 Claims, 2 Drawing Sheets

SEMICONDUCTOR NANOMATERIAL WITH HIGH STABILITY

BACKGROUND OF THE INVENTION

Field of the Invention

The present invention relates to a semiconductor nanomaterial, and in particular to a semiconductor nanomaterial with high stability.

Description of Related Art

Semiconductor nanoparticles, also referred to as quantum dots (QDs), are semiconductor materials with a nano-sized (generally <100 nm) dimensions and a crystalline structure, which can include from hundreds to thousands of atoms. Since QDs are very small, they have a large specific surface area, and also exhibit quantum confinement effects. Accordingly, they have unique physicochemical characteristics based on their size, that differ from inherent characteristics of corresponding bulk semiconductor materials.

The photoluminescence of QDs are narrower in full width at half maximum (FWHM) which gives purer color. Furthermore, the photoelectric properties of QDs can be readily controlled by adjusting their core sizes. Therefore, QDs are still under active investigation, for example, on display applications. However, when QDs are used in display apparatus, they require further increase in stability, photoluminescence quantum yield, lifetime, and other related properties.

Currently, the biggest challenge for QD application is long-term stability. External factors, such as intense light, high temperature, moisture, volatile substances and oxidants, can cause irreversible decay of QD photoluminescence intensity. Increased QD size, mainly shell thickness, can increase stability, but this requires either additional multiple reaction steps to form extra outer shells after the original QDs synthesis or increasing the synthesis reaction time of QDs, both often lead to higher cost and lower photoluminescence quantum yield.

SUMMARY OF THE INVENTION

The invention provides a quantum dot with a bi-layered shell wrapping a core to provide a better protection and improve the stability of the quantum dot, thereby effectively avoiding or reducing the influence of external factors on the quantum dot.

The invention provides a quantum dot including a core constituted of InP, a first shell constituted of ZnSe, a second shell, and a gradient alloy intermediate layer. The first shell wraps a surface of the core. The second shell wraps a surface of the first shell and has a material different from the first shell. The gradient alloy intermediate layer is formed between the core and the first shell. The gradient alloy intermediate layer includes an alloy constituted of In, P, Zn and Se. A content of the In and P gradually decreases along a direction from the core to the first shell. A content of the Zn and Se gradually increases along the direction from the core to the first shell. A particle size of the quantum dot is greater than or equal to 11 nm. The quantum dot is capable of emitting light upon excitation with a photoluminescence quantum yield equal to or more than 50%.

In one embodiment of the invention, the second shell is constituted of ZnS.

In one embodiment of the invention, the particle size of the quantum dot is in a range of 11 nm to 15 nm.

In one embodiment of the invention, the particle size of the quantum dot is greater than or equal to 15 nm.

In one embodiment of the invention, the quantum dot is capable of emitting light upon excitation with a photoluminescence quantum yield in a range of 60% to 90%.

In one embodiment of the invention, the quantum dot is capable of emitting light upon excitation with a photoluminescence quantum yield greater than or equal to 90%.

In one embodiment of the invention, the photoluminescence quantum yield of the quantum dot before and after storing at increased temperature is reduced by less than or equal to 5%.

In one embodiment of the invention, the core of the quantum dot is capable of absorbing a fixed wavelength range of light of a light source and emitting at least one different wavelength range of light.

Based on above, the invention provides the quantum dot with the bi-layered shell wrapping the core, so that the quantum dot has a diameter (or particle size) equal to or greater than 11 nm. In this case, the quantum dots of the present invention can have a better protection to improve the long-term stability of the quantum dot, thereby effectively avoiding or reducing the influence of the external factors (e.g., intense light, high temperature, moisture, volatile substances, oxidants, or the like) on the quantum dot. At the same time, the quantum dot of the present invention can also maintain the photoluminescence quantum yield greater than or equal to 50%. Therefore, the quantum dots of the present invention are suitable for applying on the display apparatus (e.g., light emitting diode (LED) device or a projector color wheel) with intense light, high temperature, etc.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the present specification, ranges represented by "a numerical value to another numerical value" are schematic representations to avoid listing all of the numerical values in the range in the specification. Therefore, the recitation of a specific numerical range discloses any numerical value in the numerical range and a smaller numerical range defined by any numerical value in the numerical range, as is the case with any numerical value and a smaller numerical range stated expressly in the specification. For instance, the range of "a particle size of 11 nm to 15 nm" discloses the range of "a particle size of 12 nm to 13 nm", regardless of whether other numerical values are listed in the specification.

Figure 1:
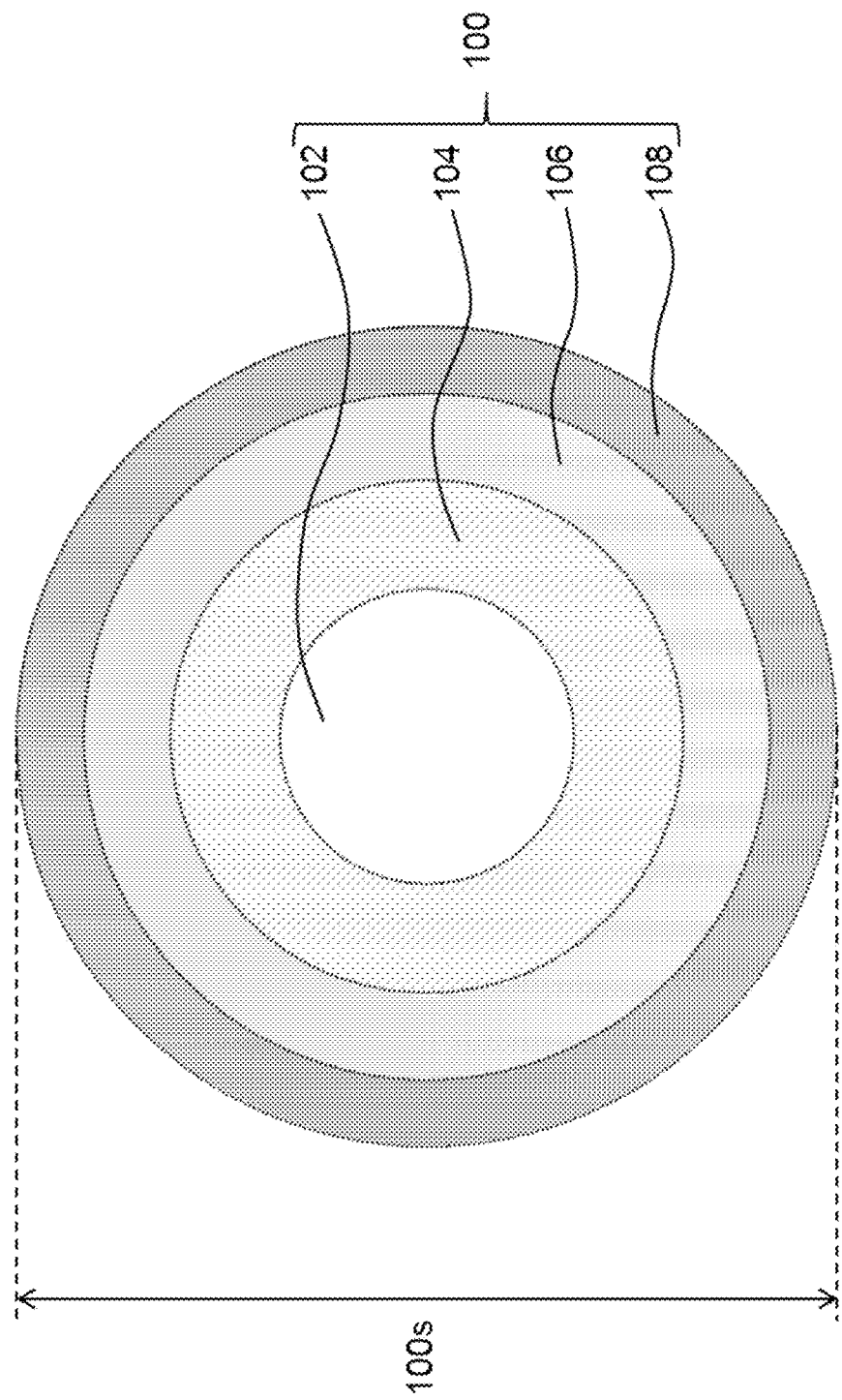
FIG. 1 is a schematic drawing illustrating a quantum dot according to an embodiment of the invention.

FIG. 1 is a schematic drawing illustrating a quantum dot according to an embodiment of the invention.

Referring to FIG. 1, a quantum dot 100 includes a core 102 constituted of indium phosphide (InP), a first shell 106, a second shell 108, and a gradient alloy intermediate layer 104. The first shell 106 wraps a surface of the core 102. The second shell 108 wraps a surface of the first shell 106. In the embodiment, the first shell 106 completely wraps the surface of the core 102, and the second shell 108 completely wraps the surface of the first shell 106. The first shell 106 and the second shell 108 may have different materials. For example, the first shell 106 is constituted of zinc selenide (ZnSe), and the second shell 108 is constituted of zinc sulfide (ZnS). However, the present invention is not limited thereto, and other materials for protecting the core 102 can also be used as materials for the first shell 106 and the second shell 108. In order to improve the stability of the quantum dot, the second shell 108 will choose a material that provides better protection for the core 102 (e.g., zinc sulfide). However, there is a larger lattice mismatch between the material with better protection and the core 102, thus it is more difficult to form strong bonding between the two materials. Therefore, the first shell 106 uses a material (e.g., zinc selenide) with a lower protection for the core 102 but has a lower lattice mismatch with the core 102.

As shown in FIG. 1, the gradient alloy intermediate layer 104 may be formed between the core 102 and the first shell 106. It should be noted that the gradient alloy intermediate layer 104 can further reduce the lattice mismatch between the core 102 and the first shell 106. In other words, the gradient alloy intermediate layer 104 can optimize the lattice arrangement between the core 102 and the first shell 106 to promote the growth of the first shell 106, thereby increasing the particle size 100s of the quantum dot 100. On the other hand, the gradient alloy intermediate layer 104 can also reduce defects and improve the quantum yield. Therefore, compared with the quantum dot without a gradient alloy intermediate layer, the embodiment of the present invention can not only effectively increase the thickness of the shell layer 106 and improve the stability of the quantum dot, but also maintain the quantum yield of the quantum dot 100. In one embodiment, the gradient alloy intermediate layer 104 includes an alloy constituted of In, P, Zn, and Se. A content of In and P gradually decreases along a direction from the core 102 to the first shell 106 (i.e., the direction from the core outward), while a content of Zn and Se gradually increases along the direction from the core 102 to the first shell 106.

In some embodiments, the particle size 100s of the quantum dot 100 is greater than or equal to 11 nm. In alternative embodiments, the particle size 100s of quantum dot 100 is in a range of 11 nm to 15 nm. In other embodiments, the particle size 100s of the quantum dot 100 is greater than or equal to 15 nm, such as 16 nm, 17 nm, 18 nm, 19 nm, 20 nm, etc. Herein, the so-called "particle size" refers to a diameter of the quantum dot. When the quantum dot is non-spherical or quasi-spherical, the diameter refers to a length of a cross-section perpendicular to a first axis of the quantum dot, and the first axis is not necessarily the longest axis of the quantum dot. For example, in the case where the cross-section is not circular, the diameter is the average value of the longest axis and the shortest axis of the cross-section. For spherical structure, the diameter is measured from one side to the other through the center of the sphere.

On the other hand, the core 102 of the quantum dot 100 can be used to absorb and emit light. In some embodiments, the core 102 of the quantum dot 100 is capable of absorbing a fixed wavelength range of light of a light source and emitting at least one different wavelength range of light. For example, the core 102 can absorb ultraviolet (UV) light with a peak wavelength less than 400 nm and emit visible light of different colors (e.g., red light, green light, or blue light) according to the particle size of the core 102. For another example, the core 102 can absorb blue light and emit visible light of different colors (e.g., red light or green light) according to the particle size of the core 102. In some embodiments, the quantum dot 100 can emit light when excited, and has a photoluminescence quantum yield greater than or equal to 50%. In alternative embodiments, the quantum dot 100 may have a photoluminescence quantum yield in a range of 60% to 90%. In other embodiments, the quantum dot 100 may have a photoluminescence quantum yield greater than or equal to 90%, such as 91%, 92%, 93%, 94%, 95%, 96%, 97%, 98%, 99%.

It should be noted that, in the present invention, the quantum dot 100 is capable of emitting light upon excitation with a photoluminescence quantum yield equal to or more than 50%, which means the core 102 of the quantum dot 100 has good quality and very few defects. In other words, the quantum dot 100 of the present invention is able to increase long-term stability while maintaining a high quantum yield. Therefore, the quantum dot 100 of the present invention is suitable for applying on the display apparatus (e.g., light emitting diode (LED) device or a projector color wheel) with intense light, high temperature, etc.

In order to improve reliability of the invention, the following lists several examples to illustrate the quantum dot of the invention further. Although the following experiments are described, the material used and the amount and ratio of each thereof, as well as handling details and handling procedures, etc., can be suitably modified without exceeding the scope of the invention. Accordingly, restrictive interpretation should not be made to the invention based on the embodiments described below.

EXPERIMENTAL EXAMPLE 1

0.575 mmol of indium acetate, 0.284 mmol of zinc acetate, 2.29 mmol of palmitic acid, and 125 mmol of 1-octadecene are heated in a vacuum environment at 140° C. for 2 hours. Next, the reaction system is changed to $N_2$ environment and the reaction system is cooled to room temperature.

Thereafter, add 0.39 mmol of tris(trimethylsilyl)phosphine and 0.39 mmol of trioctylphosphine at room temperature, then raise the temperature to 270° C. and maintain this temperature for 2 minutes to form a reaction solution.

Afterwards, the temperature of the said reaction solution is lowered to 150° C., then add selenium (2.4 mmol) dissolved in 4.05 mmol of trioctylphosphine and zinc stearate (25.27 mmol) dissolved in 88 mmol of 1-octadecene. The reaction temperature is then raised to 320° C. and maintain for 30 minutes.

At a temperature of 320° C., add selenium (2.4 mmol) dissolved in 4.05 mmol of trioctylphosphine and zinc stearate (25.27 mmol) dissolved in 88 mmol of 1-octadecene, and maintain for 30 minutes.

Next, at a temperature of 320° C., add sulfur (16 mmol) dissolved in 16.2 mmol of trioctylphosphine and maintain for 10 minutes.

At a temperature of 320° C., add zinc stearate (6.32 mmol) dissolved in 22 mmol of 1-octadecene and maintain for 10 minutes.

At a temperature of 320° C., add sulfur (16 mmol) dissolved in 16.166 mmol of trioctylphosphine and maintain for 10 minutes.

At a temperature of 320° C., add zinc stearate (5.55 mmol) dissolved in 19.33 mmol of 1-octadecene and maintain for 10 minutes.

At a temperature of 320° C., add sulfur (96 mmol) dissolved in 96.96 mmol of trioctylphosphine and maintain for 10 minutes.

At a temperature of 320° C., add zinc stearate (33.32 mmol) dissolved in 116 mmol of 1-octadecene and maintain for 30 minutes.

After cooling the said reaction solution to 200° C., add 20.75 mmol of 1-dodecanethiol and maintain for 25 minutes.

After the reaction is terminated by cooling, ethanol is added to the reaction solution to precipitate the product, and the solid is collected by centrifugation and re-dissolved in toluene.

COMPARATIVE EXAMPLE 1

0.575 mmol of indium acetate, 0.359 mmol of zinc acetate, 1.725 mmol of palmitic acid, and 30 mmol of 1-octadecene are heated in a vacuum environment at 120° C. for 2 hours. Next, the reaction system was changed to $N_2$ environment and the temperature is maintained at 280° C.

Thereafter, add 0.43 mmol of tris(trimethylsilyl)phosphine and 0.43 mmol of trioctylphosphine at 280° C. and maintain this temperature for 2 minutes to form a reaction solution.

Afterwards, the temperature of the said reaction solution is lowered to 180° C., then add selenium (0.115 mmol) dissolved in 4.05 mmol of trioctylphosphine, zinc acetate (5.175 mmol) dissolved in 30 mmol of 1-octadecene, and 10.35 mmol of oleic acid. The reaction temperature is then raised to 280° C.

Next, at a temperature of 280° C., add sulfur (0.029 mmol) dissolved in 0.029 mmol of trioctylphosphine, then raise the temperature to 300° C., and maintain for 30 minutes.

At a temperature of 300° C., add sulfur (0.115 mmol) dissolved in 0.115 mmol of trioctylphosphine, and maintain for 30 minutes.

At a temperature of 300° C., add sulfur (0.23 mmol) dissolved in 0.23 mmol of trioctylphosphine and maintain for 30 minutes.

At a temperature of 300° C., add sulfur (2.30 mmol) dissolved in 2.30 mmol of trioctylphosphine and maintain for 30 minutes.

After the reaction is terminated by cooling, ethanol is added to the reaction solution to precipitate a product, and the solid was collected by centrifugation and re-dissolved in toluene.

Particle Size Comparison

Figure 2:
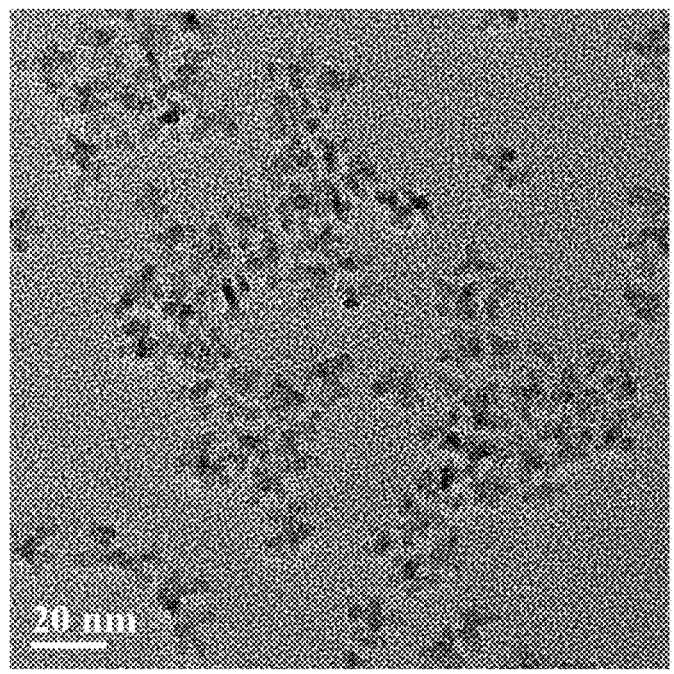
FIG. 2 is a transmission electron microscope (TEM) image of quantum dots from Example 1.
Figure 3:
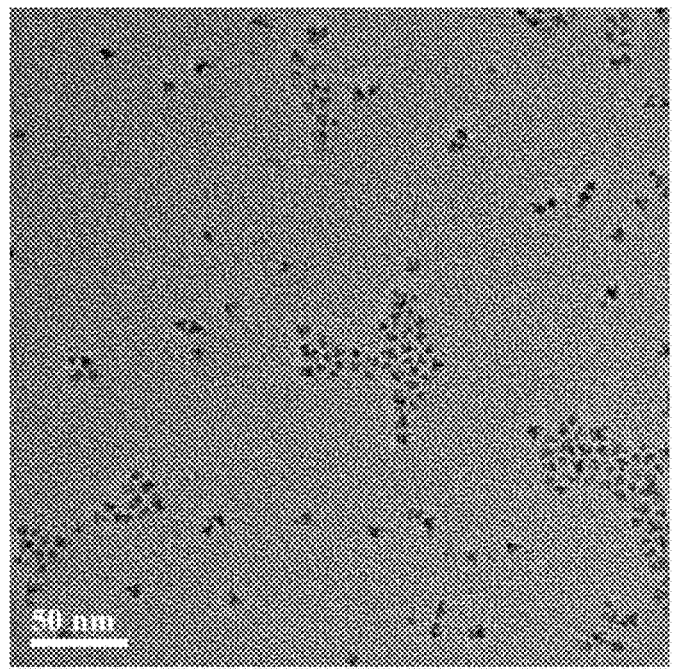
FIG. 3 is a TEM image of quantum dots from Comparative Example 1.

FIG. 2 and FIG. 3 are the TEM images of quantum dots of Experimental Example 1 and Comparative Example 1, respectively. As shown in FIG. 2 and FIG. 3, the particle size of the InP quantum dots of Experimental Example 1 is about 11 nm, and the particle size of InP quantum dots of Comparative Example 1 is about 6 nm. This clearly illustrates the particle size of the InP quantum dots of Experimental Example 1 is greater than the particle size of the InP quantum dots of Comparative Example 1. In addition, as shown in FIG. 2, the InP quantum dots of Experimental Example 1 are not spherical, but polygonal with edges and corners.

High Temperature Storage

Solutions with 1 wt % of the InP quantum dots of Experimental Example 1 and Comparative Example 1 are respectively dissolved in n-hexane and then are stored at 60° C. for 4 hours. Next, the quantum yield (QY) of Experimental Example 1 and Comparative Example 1 before and after storing at high temperature are compared. As shown in Table 1 below, the quantum yield of Experimental Example 1 before storing at high temperature is 83%, and the quantum yield after storing at high temperature drops to 79%. There is a 4% decrease in quantum yield. In one embodiment, the decrease in the photoluminescence quantum yield of the quantum dots of the present invention before and after storing at high temperature is less than or equal to 5%. In alternative embodiments, decrease in the photoluminescence quantum yield of the quantum dots of the present invention before and after storing at high temperature may be between 0% and 6%. On the other hand, the quantum yield of Comparative Example 1 before and after storing at high temperature decreases from 81% to 58%, there is a larger 23% decrease in quantum yield. This result shows that compared with the thinner shell layer of the InP quantum dots of Comparative Example 1, the InP quantum dots of Experimental Example 1 have a thicker shell, which can provide a better protection, thereby improving the stability.

TABLE 1

|  | Experimental example 1 (Mean ± two standard deviations) | Comparative example 1 (Mean ± two standard deviations) |
|---|---|---|
| Before baking | QY = 83 ± 2.3% | QY = 81 ± 3.1% |
| After baking | QY = 79 ± 4.2% | QY = 58 ± 5.3% |
| reduced magnitude | 4% | 23% |

Additionally, in the present invention, the method for forming quantum dots is to mix precursors containing In, precursors containing P, precursors containing Zn, and precursors containing Se together, then react at high temperature (about 270° C. to 320° C.) to form the quantum dots with gradient alloy. Compared with the method of forming the InP core first and then forming the shell layer wrapping the InP core (i.e., this method does not form a gradient alloy), the quantum dots of the present invention can have a gradient alloy intermediate layer between the InP core and the ZnSe shell to optimize the lattice arrangement between the InP core and the ZnSe shell. In other words, the gradient alloy intermediate layer of the present invention can not only effectively increase the thickness of the shell layer, but also maintains the quantum yield of the quantum dots. Furthermore, the method for forming quantum dots of the present invention is carried out at high temperature, therefore, it can effectively shorten the reaction time and reduce damage to the InP core, thereby improving the quality of the InP core and maintaining a high quantum yield.

In summary, the invention provides the quantum dot with the bi-layered shell wrapping the core, so that the quantum dot has a diameter (or particle size) equal to or greater than 11 nm. In this case, the quantum dots of the present invention can have a better protection to improve the long-term stability of the quantum dot, thereby effectively avoiding or reducing the influence of the external factors (e.g., intense light, high temperature, moisture, volatile substances, oxidants, or the like) on the quantum dot. At the same time, the quantum dot of the present invention can also maintain a photoluminescence quantum yield greater than or equal to 50%. Therefore, the quantum dots of the present invention are suitable for applying on the display apparatus (e.g., light emitting diode (LED) device or a projector color wheel) with intense light, high temperature, etc.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A quantum dot, comprising:
   a core constituted of InP;
   a first shell constituted of ZnSe and wrapping a surface of the core;
   a second shell wrapping a surface of the first shell and having a material different from the first shell; and
   a gradient alloy intermediate layer formed between the core and the first shell, and comprising an alloy constituted of In, P, Zn and Se, wherein a content of the In and P gradually decreases along a direction from the core to the first shell, a content of the Zn and Se gradually increases along the direction from the core to the first shell,
   wherein a particle size of the quantum dot is greater than or equal to 11 nm, and the quantum dot is capable of emitting light upon excitation with a photoluminescence quantum yield equal to or more than 50%.

2. The quantum dot according to claim 1, wherein the second shell is constituted of ZnS.

3. The quantum dot according to claim 1, wherein the particle size of the quantum dot is in a range of 11 nm to 15 nm.

4. The quantum dot according to claim 1, wherein the particle size of the quantum dot is greater than or equal to 15 nm.

5. The quantum dot according to claim 1, wherein the quantum dot is capable of emitting light upon excitation with a photoluminescence quantum yield in a range of 60% to 90%.

6. The quantum dot according to claim 1, wherein the quantum dot is capable of emitting light upon excitation with a photoluminescence quantum yield greater than or equal to 90%.

7. The quantum dot according to claim 1, wherein the photoluminescence quantum yield of the quantum clot before and after storing at increased temperature is reduced by less than or equal to 5%.

* * * * *